US011405172B2

(12) United States Patent
Abotabl et al.

(10) Patent No.: US 11,405,172 B2
(45) Date of Patent: Aug. 2, 2022

(54) FULL DUPLEX INTERFERENCE MEASUREMENT AND REPORTING

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Wanshi Chen, San Diego, CA (US); Huilin Xu, San Diego, CA (US); Hung Dinh Ly, San Diego, CA (US); June Namgoong, San Diego, CA (US); Tingfang Ji, San Diego, CA (US); Shimman Arvind Patel, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/101,987

(22) Filed: Nov. 23, 2020

(65) Prior Publication Data

US 2021/0194663 A1   Jun. 24, 2021

Related U.S. Application Data

(60) Provisional application No. 62/951,653, filed on Dec. 20, 2019.

(51) Int. Cl.
*H04L 5/14* (2006.01)

(52) U.S. Cl.
CPC .................. *H04L 5/1461* (2013.01)

(58) Field of Classification Search
CPC ... H04L 5/1461; H04L 5/0053; H04L 5/0073; H04L 5/14; H04W 72/082; H04B 17/345; H04B 17/327
See application file for complete search history.

(56) References Cited

U.S. PATENT DOCUMENTS

| 11,212,056 | B2* | 12/2021 | Li | H04W 72/06 |
| 2008/0019309 | A1* | 1/2008 | Kwun | H04W 16/02 370/329 |

(Continued)

OTHER PUBLICATIONS

International Search Report and Written Opinion—PCT/US2020/062036—ISA/EPO—dated Mar. 3, 2021.

*Primary Examiner* — Pao Sinkantarakorn
*Assistant Examiner* — Kabir U Jahangir
(74) *Attorney, Agent, or Firm* — ArentFox Schiff LLP

(57) ABSTRACT

This disclosure provides systems, devices, apparatus and methods, including computer programs encoded on storage media, for interference measurement and reporting by a UE. The interference measurement can be self-initiated by the UE or based on a request received from a BS. To measure the interference, the UE transmits a first signal in UL resources to a first BS concurrently with receiving a second signal in DL resources from one of the first BS or a second BS. The received second signal includes interference associated with the transmitted first signal. Based on the received second signal, the UE determines a level of the interference that is associated with the transmitted first signal. Information associated with the level of the interference is then transmitted to the first BS, such as an indication of a guard band that is to be incorporated between the UL resources and the DL resources.

30 Claims, 11 Drawing Sheets

(56) References Cited

U.S. PATENT DOCUMENTS

| | | | |
|---|---|---|---|
| 2015/0327244 A1* | 11/2015 | Pajukoski | H04L 5/0003 370/330 |
| 2018/0287739 A1 | 10/2018 | Kim et al. | |
| 2018/0302201 A1* | 10/2018 | Yoo | H04L 5/0048 |
| 2019/0305924 A1 | 10/2019 | Kim et al. | |
| 2020/0220585 A1* | 7/2020 | John Wilson | H04B 7/0626 |
| 2020/0389805 A1* | 12/2020 | Kim | H04J 11/00 |
| 2021/0007116 A1* | 1/2021 | Zhou | H04L 5/001 |

* cited by examiner

FULL DUPLEX INTERFERENCE MEASUREMENT AND REPORTING

CROSS REFERENCE TO RELATED APPLICATION(S)

This application claims the benefit of U.S. Provisional Application Ser. No. 62/951,653, entitled "FULL DUPLEX INTERFERENCE MEASUREMENT AND REPORTING" and filed on Dec. 20, 2019, of which is expressly incorporated by reference herein in its entirety.

BACKGROUND

Technical Field

The present disclosure relates generally to communication systems, and more particularly, to interference measurement and reporting.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. The sole purpose of the summary is to present some concepts of one or more aspects in a simplified form as a prelude to the more detailed description that is presented later.

Full duplex (FD) communication is a wireless communication method that supports simultaneous transmission and reception of information over a same frequency band. In this manner, spectral efficiency can be improved over half duplex (HD) communication, which only supports transmission/reception of information in one direction at a time. Due to the simultaneous nature of FD communication, a user equipment (UE) may experience self-interference caused by signal leakage from the UE's local transmitter to the UE's local receiver. Interference (e.g., UE self-interference or interference caused by other equipment) may impact a quality of the information communicated to/from the UE.

Accordingly, described herein are systems, devices, apparatuses, and methods, including computer programs encoded on storage media, for interference measurement and reporting by a UE. The interference measurement may be self-initiated by the UE or initiated via a request received from a base station (BS). Upon initiation of the interference measurement, the UE transmits a first signal in uplink (UL) resources to a first BS concurrently with receiving a second signal in downlink (DL) resources. The first signal may be a sounding reference signal (SRS), which facilitates estimating a quality of the UL resources over a given bandwidth. The second signal may be received from the first BS or from a second BS. In either case, the received second signal includes interference associated with the transmitted first signal.

The UE determines a level of the interference that is associated with the transmitted first signal, based on the received second signal. For example, the interference measurement may be performed in a given number of resource elements (REs) or resource blocks (RBs) adjacent to the UL resources, such that the UE can identify a number of the adjacent REs or RBs from the UL resources at which the interference is below a predefined level. The identified number of the adjacent REs or RBs from the UL resources defines a width of a guard band that is to be incorporated between the UL resources and the DL resources. Information associated with the determined level of interference (e.g., the width of the guard band) is then transmitted to the first BS.

In an aspect of the disclosure, a method, a computer-readable medium, and an apparatus are provided for wireless communication. The apparatus includes a memory and at least one processor coupled to the memory. The memory includes instructions which, when executed by the processor, cause the processor to transmit a first signal in UL resources to a first base station and receive a second signal in DL resources concurrently with the transmission of the first signal to the first base station. The received second signal includes interference associated with the transmitted first signal. The at least one processor is further configured to determine a level of the interference received in the second signal that is associated with the transmitted first signal, and transmit the information associated with the determined level of interference to the first base station.

To the accomplishment of the foregoing and related ends, the one or more aspects include the features hereinafter fully described and particularly pointed out in the claims. The following description and the annexed drawings set forth in detail certain illustrative features of the one or more aspects. Such features are indicative, however, of but a few of the various ways in which the principles of various aspects may be employed, and this description is intended to include all such aspects and their equivalents.

DETAILED DESCRIPTION

Figure 1:
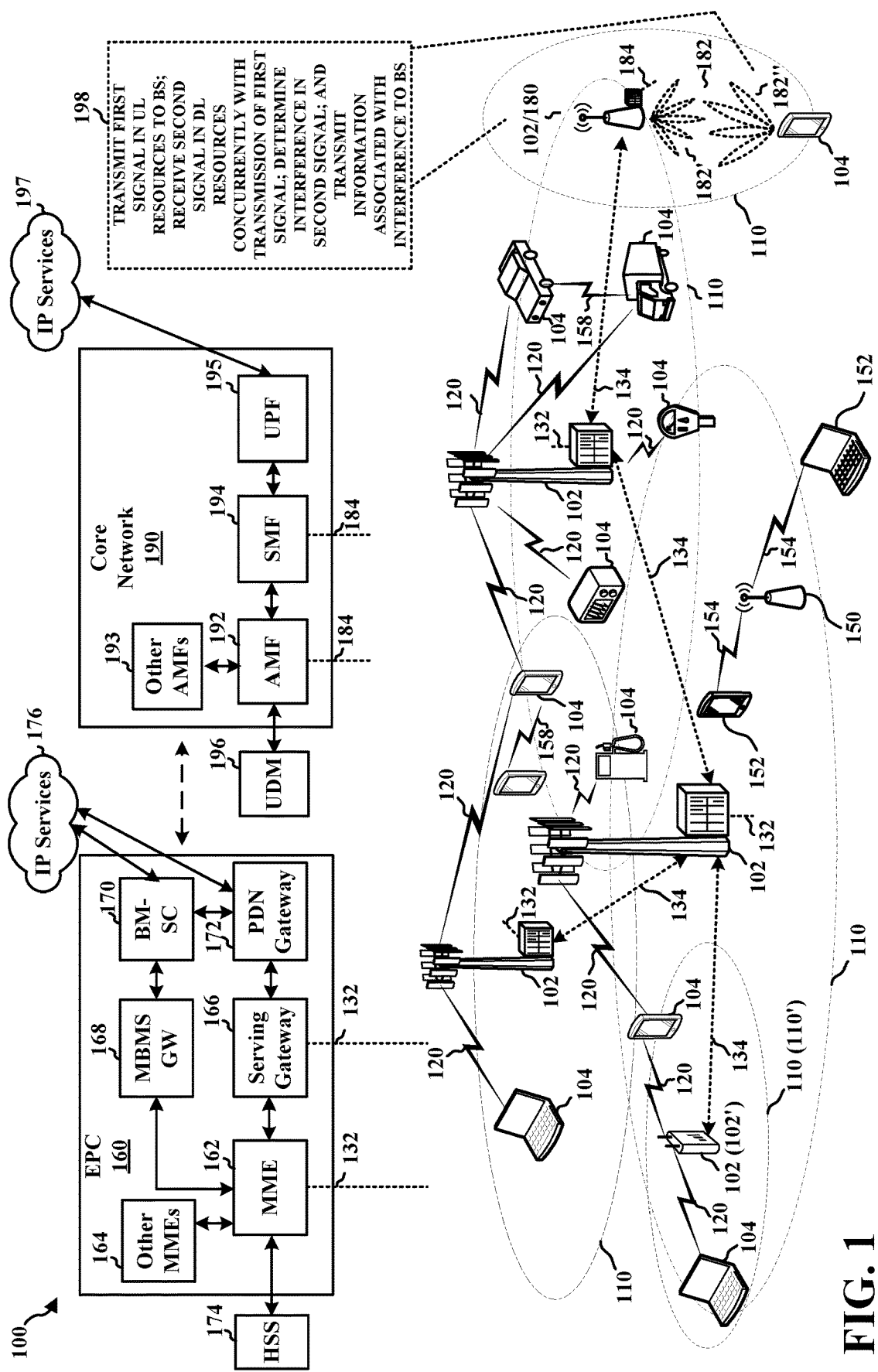
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be via one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to the DL and the UL (e.g., more or fewer carriers may be allocated for the DL than for the UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 is configured to transmit a first signal in UL resources to the base station 180; receive a second signal in DL resources concurrently with transmission of the first signal; determine interference in the second signal; and transmit information associated with the interference to the base station (198). Although the following description may be focused on 5G NR, the concepts described herein may be applicable to other similar areas, such as LTE, LTE-A, CDMA, GSM, and other wireless technologies.

Figure 2:
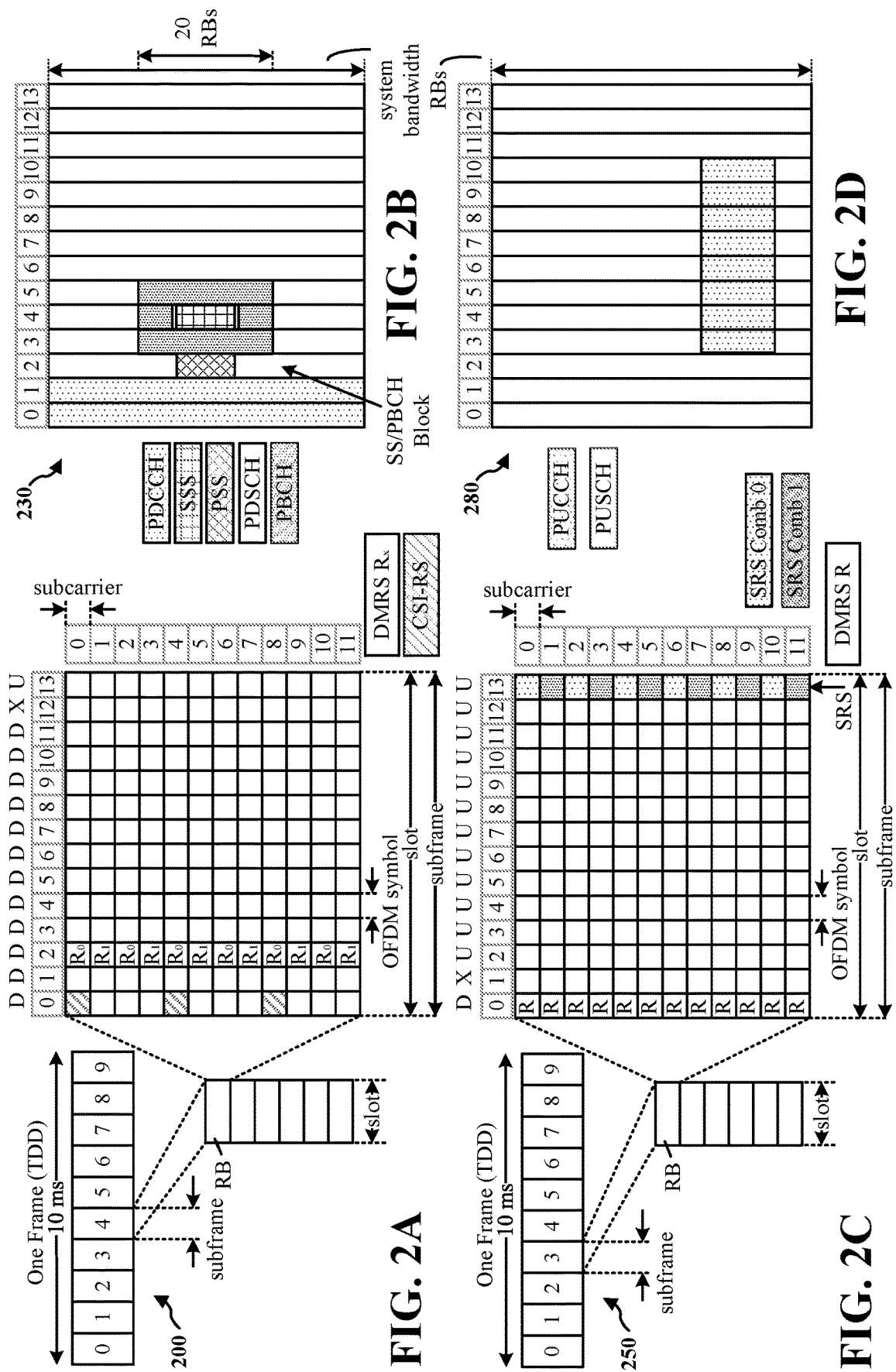
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on the DL may be cyclic prefix (CP) OFDM (CP-OFDM) symbols. The symbols on the UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as a physical RB (PRB)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
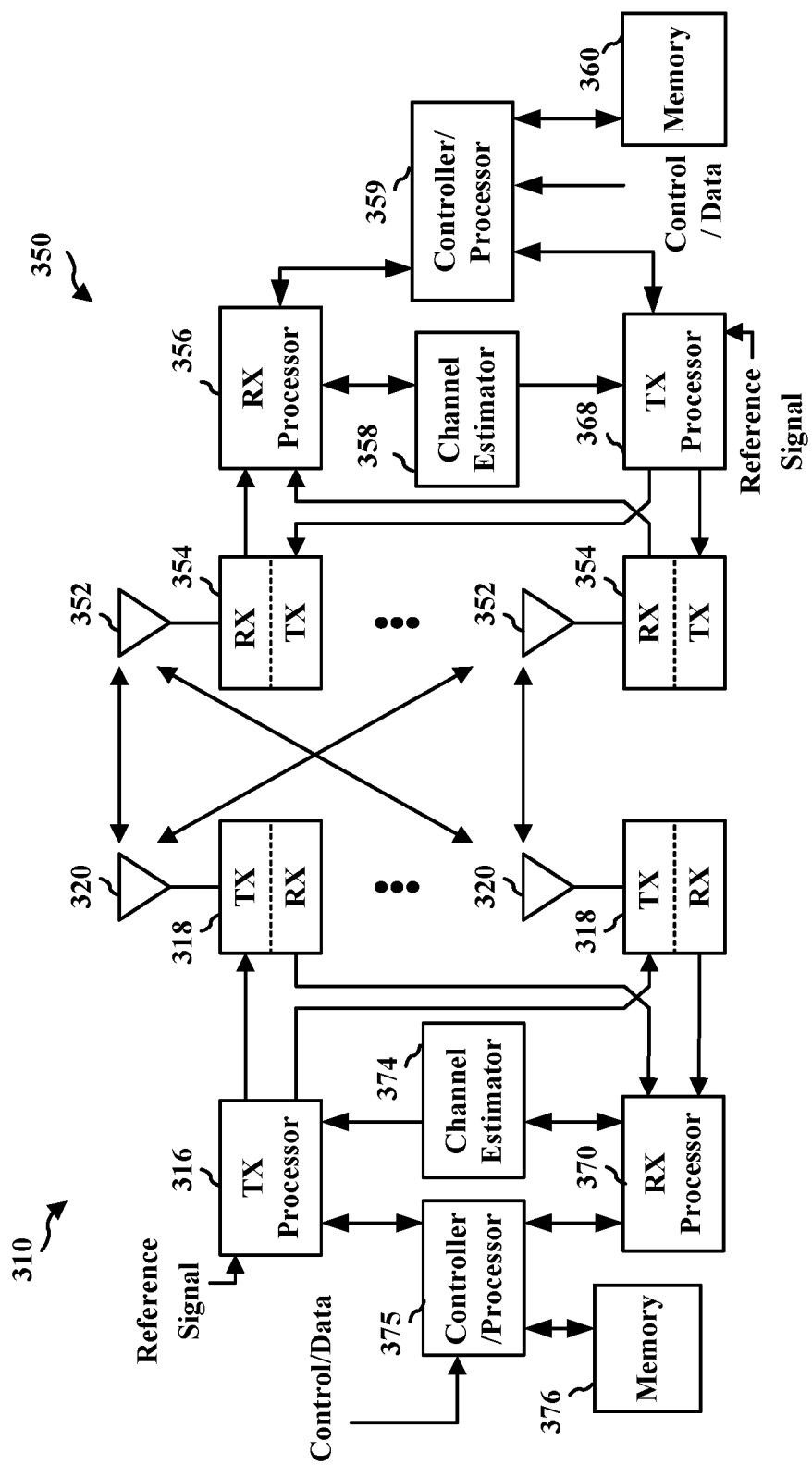
FIG. 3 is a diagram illustrating an example of a BS and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements are needed in mobile broadband to continue the progression of such technologies.

Figure 4A:
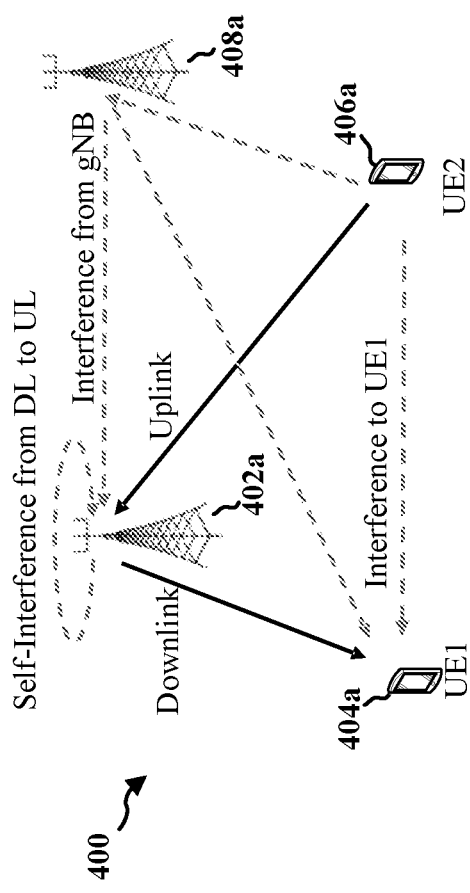
FIGS. 4A, 4B, and 4C illustrate exemplary modes of FD communication.
Figure 4C:
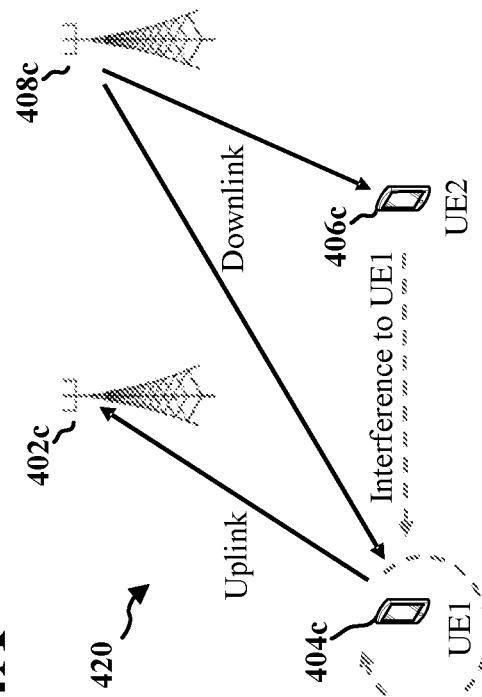
Figure 4B:
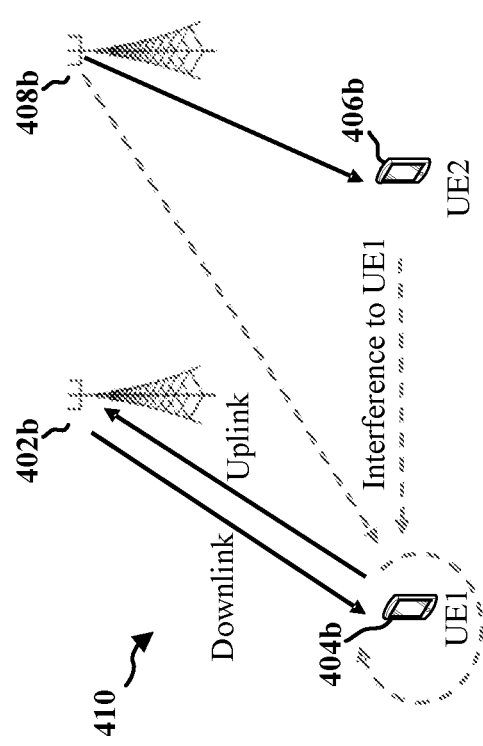

FIGS. 4A-4C illustrate modes of FD communication. FD communication is a wireless communication method that supports simultaneous transmission and reception of information over a same frequency band. In this manner, spectral efficiency may be improved over HD communication, which only supports transmission or reception of information in one direction at a time. Due to the simultaneous Tx/Rx nature of FD communication, a UE or a BS may experience self-interference caused by signal leakage from the UE's local transmitter to the UEs local receiver. In addition, the UE or BS could likewise experience interference from other devices, such as transmissions from a second UE or a second BS. Such interference (e.g., self-interference or interference caused by other devices) may impact a quality of information communicated via the signal, or even lead to a loss of the information altogether.

FIG. 4A shows a first configuration 400 in which a first BS 402a is in communication with a first UE 404a and a second UE 406a. The first BS 402a is a FD BS, whereas the first UE 404a and the second UE 406a may be configured as either a HD UE or a FD UE. The second UE 406a may transmit a fist signal in UL resources to the first BS 402a as well as to other BSs, such as a second BS 408a in proximity to the second UE 406a. The first BS 402a and the second BS 408a may be configured as either an eNB or a gNB. In FIG. 4A, the first BS 402a transmits a second signal in DL resources to the first UE 404a concurrently with receiving the first signal in UL resources from the second UE 406a. Accordingly, self-interference may occur at the first BS 402a as a result of the second signal and the first signal being communicated simultaneously. Further interference may occur at the first BS 402a via signals emitted from the second BS 408a. Interference may also occur at the first UE 404a based on such signals emitted from the second BS 408a as well as from UE-based signals emitted by the second UE 406a.

FIG. 4B shows a second configuration 410 in which a first BS 402b is in communication with a first UE 404b. The first BS 402b is a FD BS and the first UE 404b is a FD UE. That is, the first BS 402b can receive a first signal in UL resources from the first UE 404b concurrently with transmitting a second signal in DL resources to the first UE 404b; and the first UE 404b can receive the second signal in DL resources from the first BS 402b concurrently with transmitting the first signal in UL resources to the first BS 402b. Accordingly, self-interference may occur at either or both of the first BS 402b and/or the first UE 404b as a result of the first signal and the second signal being simultaneously communicated between the first BS 402b and the first UE 404b. Further interference may also occur at the first UE 404b based on one or more signals emitted from a second UE 406b and/or a second BS 408b in proximity to the first UE 404b. The first BS 402b and the second BS 408b can be configured as either an eNB or a gNB.

FIG. 4C shows a third configuration 420 in which a first UE 404c is in communication with a first BS 402c and a second BS 408c. The first UE 404c is a FD UE for which the first BS 402c and the second BS 408c serve as multiple transmission and reception points (multi-TRPs) for UL and DL resources. In an example, the second BS 408c may be in communication with a second UE 406c and transmit further DL resources thereto. In FIG. 4C, the first UE 404c is configured to transmit an a first signal in UL resources to the first BS 402c concurrently with receiving a second signal in DL resources from the second BS 408c. Accordingly, self-interference may occur at the first UE 404c as a result of the first signal and the second signal being communicated simultaneously. Further interference may also occur at the first UE 404c via UE-based signals emitted from the second UE 406c.

Figure 5B:
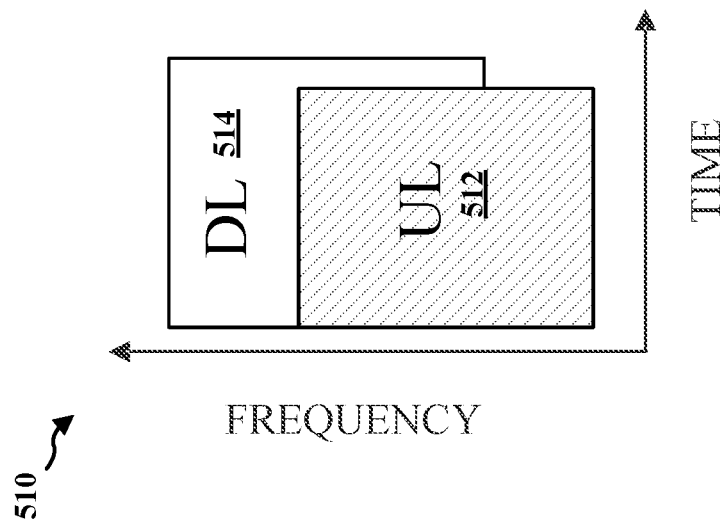
FIGS. 5A and 5B illustrate examples of in-band full duplex (IBFD) resources.
Figure 5A:
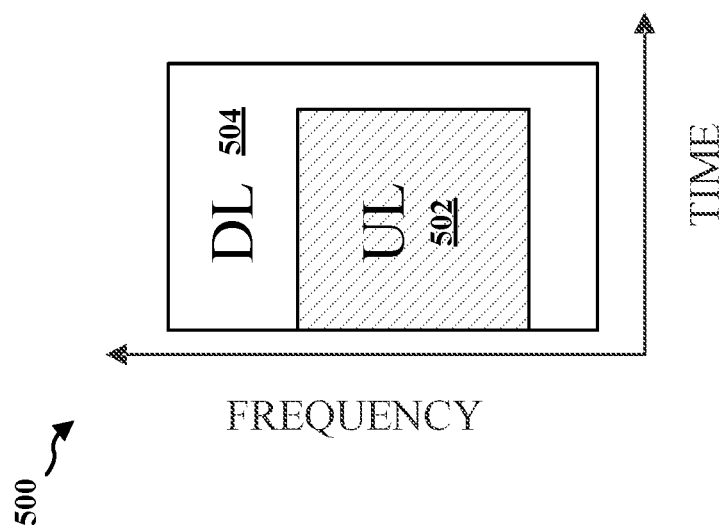

FIGS. 5A-5B illustrate a first example 500 and a second example 510 of resources that are in-band full duplex (IBFD). In general, FD operations can be grouped into two categories: (1) IBFD, and (2) sub-band flexible division duplex (sub-band FDD). In IBFD, signals are transmitted and received at a same time and frequency. As shown in the first example 500, a time and a frequency of a UL band 502 may fully overlap with a time and a frequency of a DL band 504; or as alternatively shown in the second example 510, a time and a frequency allocation for an UL band 512 may partially overlap with a time and a frequency allocation for a DL band 514. In either case, the FD operations correspond to IBFD.

IBFD is in contrast to sub-band FDD, where a UL band and a DL band (while still transmitted and received at a same time) are transmitted and received at different frequencies. In particular, the DL band is separated from the UL band in the frequency domain for sub-band FDD operations (e.g., by separating the UL band and the DL band with a guard band or by utilizing a UL band and a DL band that are immediately adjacent to each other in which a corresponding guard band width would be 0). Given that output signals from a UE transmitter can have a leakage that extends outside the UL band, a guard band of some width can be advantageous for reducing interference between UL resources and DL resources. Sub-band FDD may also be referred to as "flexible duplex."

Figure 6:
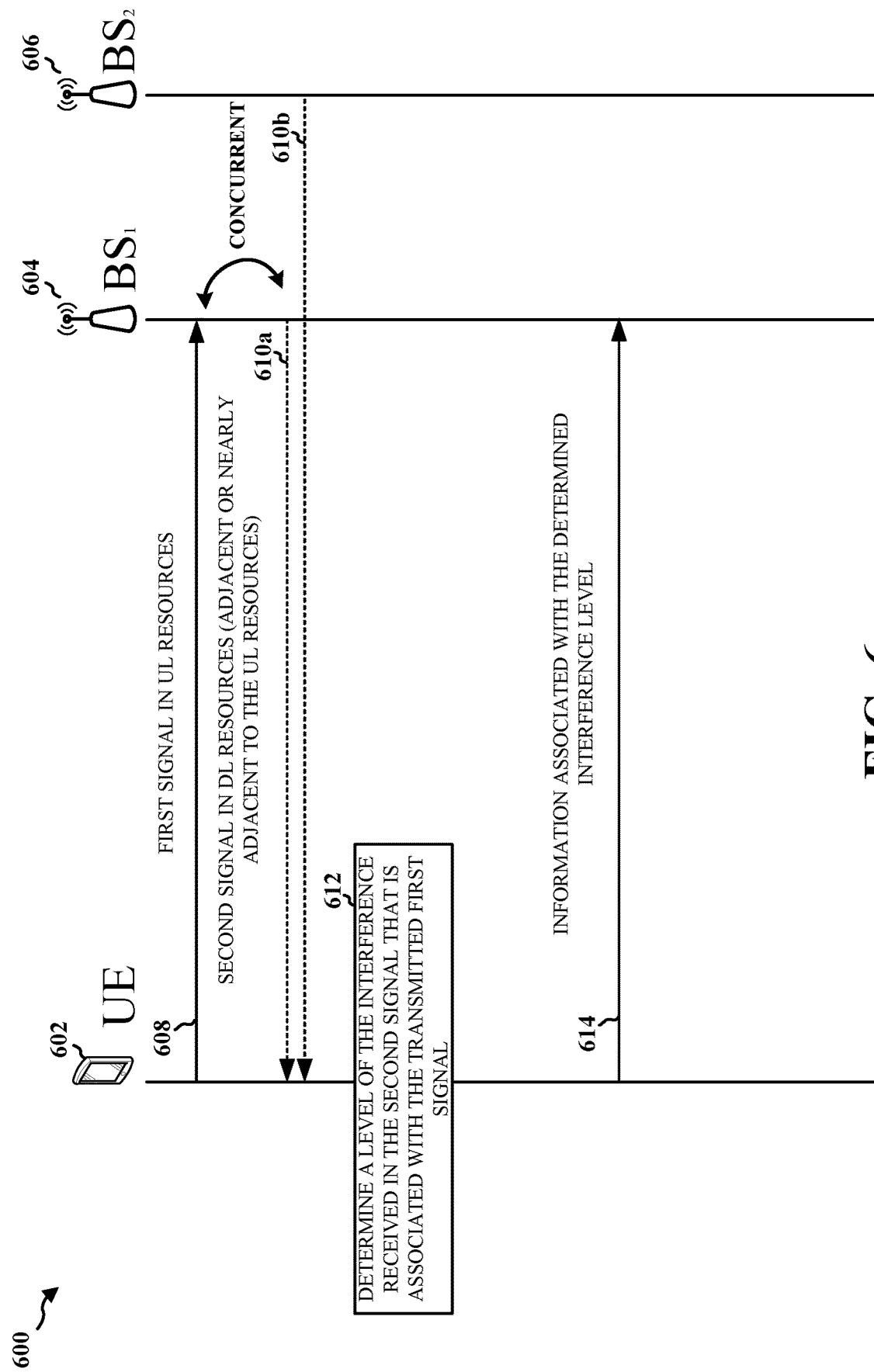
FIG. 6 is a call flow diagram illustrating communications between a UE and at least one BS.
Figure 7B:
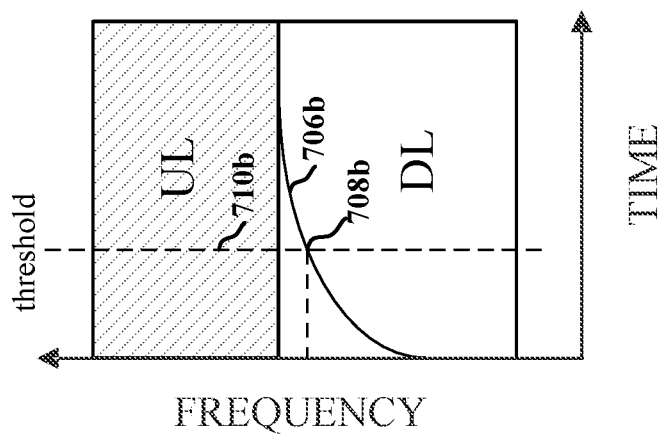
FIGS. 7A and 7B illustrate interference thresholds in relation to frequency division duplex (FDD) resources.
Figure 7A:
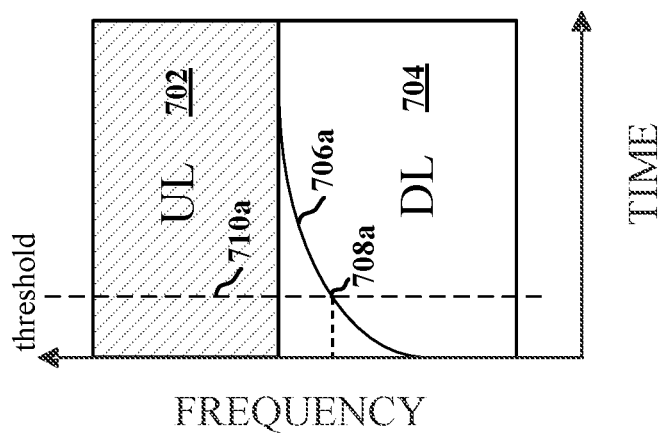

FIG. 6 is a call flow diagram 600 illustrating communications between a UE 602 and at least one BS (604 and/or 606). FIGS. 7A-7B illustrate interference thresholds in relation to UL resources and DL resources, where the interference thresholds may be used to define a size of a guard band that is to be incorporated between the UL resources and the DL resources.

Referring back to FIG. 6, at 608, the UE 602 transmits a first signal in UL resources to the BS 604. The first signal may be a SRS or may be data (on a PUSCH) or control information (on a PUCCH). At 610a/610b, the UE 602 receives a second signal in DL resources concurrently with the UE 602 transmitting the first signal, where the DL resources are adjacent or nearly adjacent to the UL resources. The UE 602 may receive at 610a the second signal from the BS 604 or may receive at 610b the second signal from the BS 606. At 612, the UE determines a level of the interference received in the second signal that is associated with the transmitted first signal. Transmission of the first signal in the UL by the UE 602 self-interferes with the reception of the second signal in the DL by the UE 602, as the UL resources are close in frequency to the DL resources, and the first signal is received in some form as interference with the second signal. At 614, the UE 602 transmits information associated with the determined interference level to the BS 604.

Referring to FIG. 7A, as illustrated via noise threshold 710a, the UE 602 may only be configured to suppress a certain level of interference caused by leakage from its transmitter. Thus, a guard band may need to be incorporated between the UL resources 702 and the DL resources 704. In order to minimize the waste of frequency resources caused by excessive separation between the UL resources 702 and the DL resources 704, it is desirable to identify a minimum size of a guard band that would keep the interference below a threshold amount.

Adjacent channel leakage ratio (ACLR) measurements by the UE 602 may be performed online or offline. When ACLR is performed offline and a threshold is already known for a given bandwidth, power, waveform, etc., the ACLR measurement may be compared to an interference threshold 706a such that a guard band may be identified without having the UE 602 measure the level of interference. Nevertheless, when the UE 602 is surrounded by clutter such as metallic clutter, online refinement may improve interference measurement accuracy, as clutter may cause changes in characteristics of the self-interference. For example, in industrial IoT, online refinement may improve measurement accuracy for a UE 602 that is incorporated in machinery comprising a metallic structure.

The UE 602 is configured to measure its residual self-interference based on a reference signal (RS) and report a desired guard band to the BS 604. The guard band may be reported in terms of a number of RBs or REs from the UL resources 702 at which the interference is below a threshold level. Upon measuring the interference and identifying a given noise threshold 710a, the UE 602 may determine the minimum number of REs or RBs that are needed for the guard band.

The RS can be either a SRS or a CSI-RS. In order to measure self-interference the UE 602 has to transmit some signal (e.g., the first signal transmitted in UL resources at 608). For example, a SRS is transmitted in the UL band and interference is measured in a given number of REs or RBs adjacent to the UL band. That is, the UE 602 may transmit the SRS and, at the same time, measure leakage at one or more locations below the UL resources 702 in frequency. In this example, it is possible that nothing else is being received in the DL band allocation, except for the leakage, thereby allowing the UE 602 to determine a strength of the leakage in the DL band allocation. Additionally or alternatively, the UE 602 can receive CSI-RS and measure the interference at the one or more locations below the UL resources 702 in frequency, similar to CSI interference measurement (CSI-IM) procedures. CSI-RS may be initially received prior to transmitting the first signal at 608; then, the CSI-RS is received again concurrently with transmitting the first signal at 608 (e.g., SRS, data, control signals, etc.) and compared to the initially received CSI-RS to determine how the CSI-RS is impacted by transmission of the first signal at 608. The channel quality is measured at the one or more locations below the UL resources 702 in frequency and a size of the guard band can be determined based thereon.

A bandwidth of the RS used for self-interference measurement affects measurement configurations, as the interference threshold 706a is manipulated based on a size of the RS bandwidth. It can be observed that SRS transmitted over a smaller UL bandwidth than, for example, that of the UL resources 702 would causes less interference since a smaller bandwidth corresponds to an interference threshold that rises at a slower rate than that of the interference threshold 706a. Interference measurement can be further dependent upon a type of the waveform (e.g., CP-OFDM or DFT-s-OFDM). More or less interference may result from waveforms of different types. Therefore, different waveforms may have different corresponding measurement configurations.

The noise threshold 710a may be configured by the network and/or be dependent upon a capability of the UE 602. The noise threshold 710a represents some upper noise value that the UE 602 is configured to suppress. The noise value may be identified by the network, where the network may instruct the UE 602 to only accept a noise value up to X amount, thereby allowing the network to control the rest of the UE's band allocation. In a further example, a first UE may be capable of suppressing more interference than a second UE, such that the noise threshold (e.g., noise thresholds 710a and 710b) may be set based on a capability of the corresponding UE. For instance, some UEs may execute interference cancellation (IC) algorithms that change the noise value that the UE can suppress. FIG. 7B represents an example in which an IC algorithm is executed by a UE. When compared to FIG. 7A, an intersection 708b of the noise threshold 710b and the interference threshold 706b is in a higher subcarrier than an intersection 708a of the noise threshold 710a and the interference threshold 706a. A threshold value at these intersections 708a and 708b may be expressed in terms of rise over thermal noise (e.g., desense). A width of the guard band may then be defined based on the subcarrier that crosses through the threshold value located at the intersections 708a and 708b.

The UE 602 measures its interference in N adjacent REs or RBs from at least one side of its UL transmission, where N is either configured by the network or left to UE implementation. In cases where interference is measured on both sides of the UL resources 702, the UE 602 may measure interference in N adjacent REs or RBs from each side of the UL resources 702; or measure interference in N adjacent REs or RBs from a first side of the UL resources 702 and M adjacent REs or RBs from a second side of the UL resources 702, where N and M are different. Measurement configuration can also be dependent upon a total number of REs or RBs in the UL band and/or a Tx power level, as a higher Tx power in the UL band increases leakage from the transmitter.

The UE 602 reports the measured interference and/or the guard band size in terms of RBs or REs, as for example via transmission 614. When the UE reports the guard band to the BS 604 in terms of the number of RBs or REs, the report may be sent in PUCCH, if the payload to carry the report is small enough. When the UE 602 reports the measured interference to the BS 604, the report may be transmitted in either PUCCH or PUSCH.

Self-interference measurements may be triggered either by the UE 602 or by the BS 604 (e.g., based on network traffic or other metrics). The BS 604 may transmit the request to initiate a self-interference measurement via RRC, a media access control-control element (MAC-CE), or DCI. The UE 602 may transmit the request to initiate a self-interference measurement based on a reference signal received power (RSRP) threshold. For instance, RSRP in the DL transmission that is below the RSRP threshold can be indicative of self-interference that may require a wider guard band. Such interference can be identified by the UE 602 based on a reduction in the RSRP, since any current guard band that is being used would allow a high level of interference to occur in the DL band at locations in frequency above the subcarrier that crosses through the intersection 708a. Additionally or alternatively, the UE 602 may transmit the request to initiate the self-interference measurement based on expiration of a measurement timer.

During the self-interference measurement, different UL transmissions of different UEs may be orthogonal, such that the UL transmissions of the different UEs do not interfere with each other's measurements. For example, if a second UE is transmitting close in frequency to the UE 602, interference from the second UE may leak into a guard band defined for the UE 602. This leakage into the guard band for the UE 602 may affect the accuracy of self-interference measurements performed by the UE 602. Accordingly, the UL transmissions of the different UEs can be time division multiplexed (TDMed) to reduce interference with each other; or the UL transmissions can be separated by a larger guard band.

In some aspects, the UE 602 may be configured by the network to turn a UE IC capability on or off. Switching IC off may be performed for power saving purposes or when the UL bandwidth is too large to apply the IC, whereas switching IC on may be performed to reduce the leakage from the UL transmission so that, for example, more usable bandwidth can be packed into a smaller area. Furthermore, the IC capability may not necessarily be based on strict on/off switching. Different component configurations of the UE 602 may allow the IC capability to be partially turned on (e.g., performing IC at a level that is less than the UE's maximum IC capability).

The IC capability of the UE 602 may be reported to the BS 604 in an N-bit format, which is indicative of the different IC techniques that can be performed. For instance, a number of IC techniques that are possible for a given UE may be conveyed to the network based on $2^N$ possibilities. Further, the IC capability of the UE 602 may be reported to the BS 604 in terms of a number of kernels used during the IC, where kernels are processing features that are used in execution of the IC algorithm. While an increased number of kernels may provide better IC, the increased number of kernels can results in greater complexities for the UE 602. In an exemplary configuration, the UE 602 may be capable of working on 2-4 kernels. The number of kernels may also be communicated to the network so that the network can perform tradeoff determinations between how much IC is desirable versus the complexity of performing the IC.

Figure 8C:
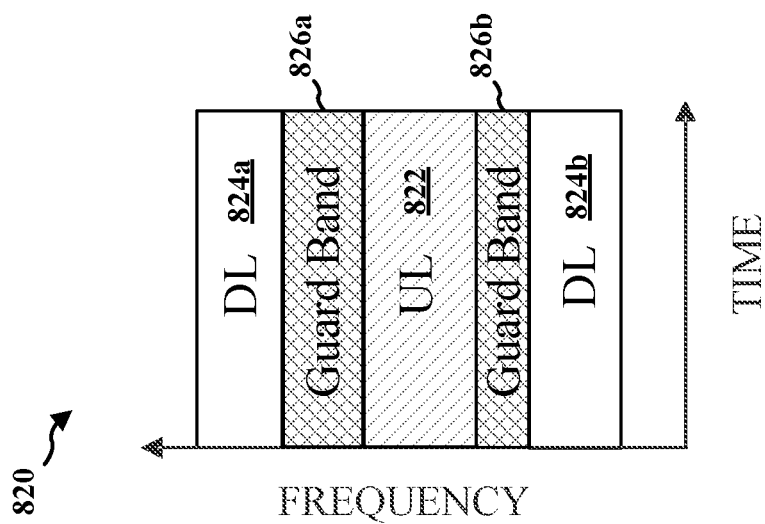
FIGS. 8A, 8B, and 8C illustrate FDD resources that are separated by a guard band.
Figure 8B:
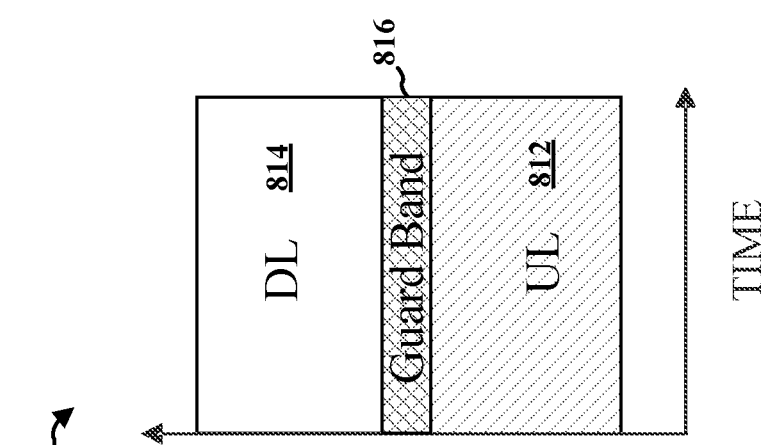
Figure 8A:
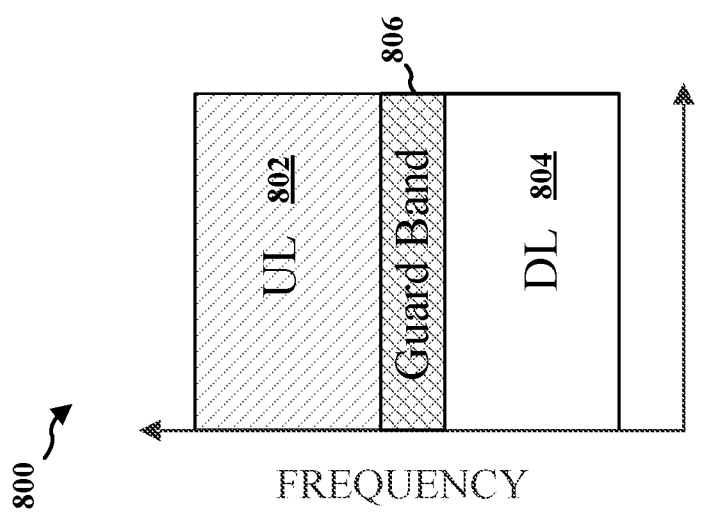

FIGS. 8A-8C illustrate FDD resources that are separated by a guard band. In FIG. 8A, a first FDD diagram 800 includes UL resources 802 that are located at a higher frequency than the DL resources 804. A guard band 806 is incorporated between the UL resources 802 and the DL resources 804. In FIG. 8B, a second FDD diagram 810 is illustrated that is similar to the first FDD diagram 800, except that the respective UL resources 812 and DL resources 814 are inverted in comparison to the first FDD diagram 800. Specifically, the UL resources 812 are located at a lower frequency than the DL resources 814. A guard band 816 is incorporated between the UL resources 812 and the DL resources 814. In both the first FDD diagram 800 and the second FDD diagram 810, the UL resources (802 and 812) are located adjacent to their respective DL resources (804 and 814), albeit along opposite edges of the DL resources (804 and 814). The guard bands (806 and 816) may have a same width or a different width, depending on a level of interference measured by a UE above and below their respective UL resources (802 and 812).

In FIG. 8C, a third FDD diagram 820 is illustrated that includes UL resources 822 between first DL resources 824a and second DL resources 824b. A first guard band 826a is incorporated between the UL resources 822 and the first DL resources 824a; and a second guard band 826b is incorporated between the UL resources 822 and the second DL resources 824b. The first guard band 826a and the second guard band 826b may have a same width or a different width, depending on the level of interference measured by a UE on either side of the UL resources 822. That is, an interference threshold (e.g., the interference thresholds 706a or 706b) may be mapped adjacent to the UL resources 822, below and/or above the UL resources 822, to determine a size of the guard bands (826a and 826b). The first guard band 826a and the second guard band 826b may further be of a same width or a different width than the guard bands (806 and 816).

Figure 9:
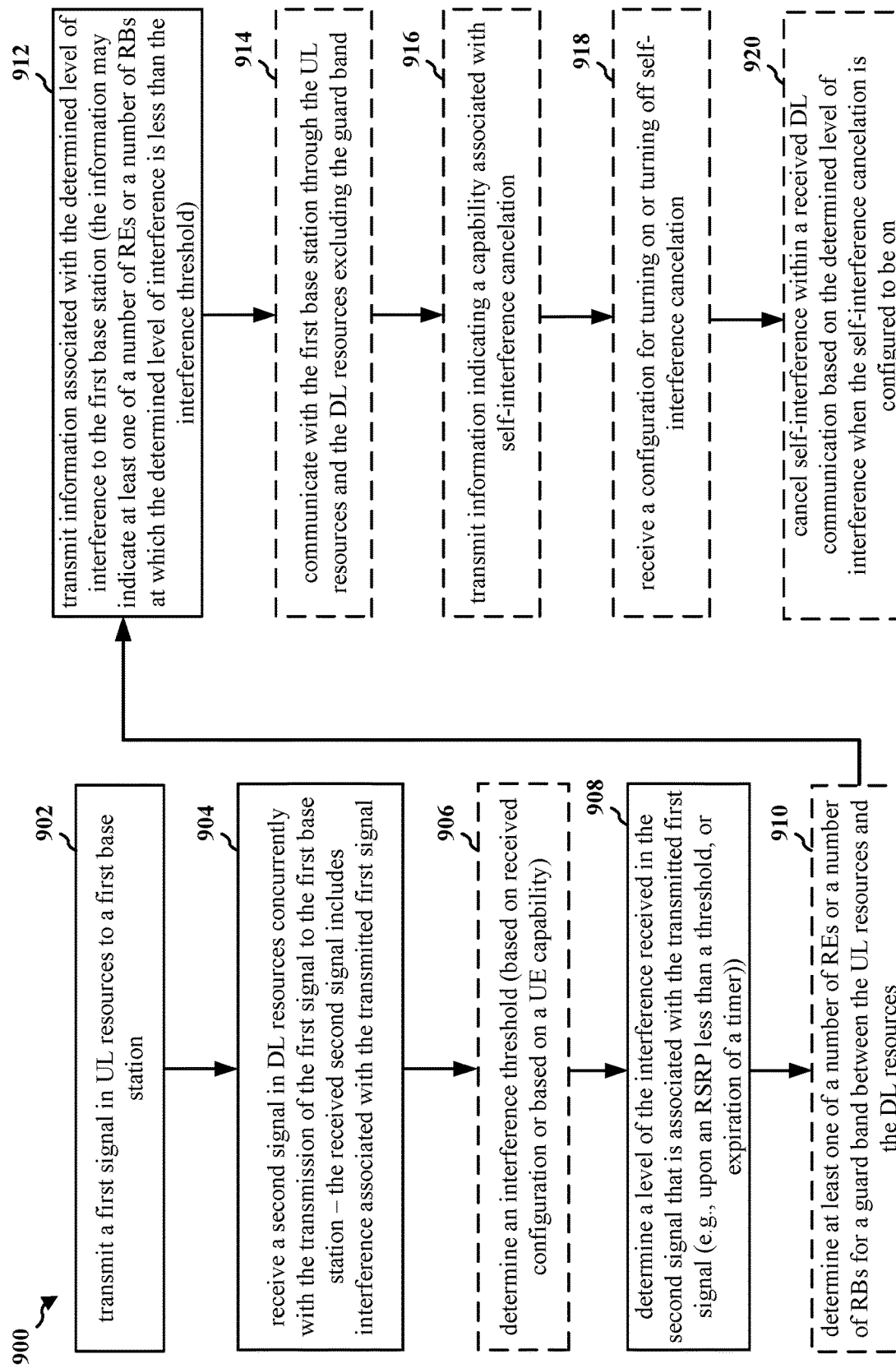
FIG. 9 is a flowchart of a method of wireless communication.

FIG. 9 is a flowchart 900 of a method of wireless communication. The method may be performed by a UE (e.g., the UE 602, which may include the memory 360 and which may be the entire UE 602 or a component of the UE 602, such as the TX processor 368, the RX processor 356, and/or the controller/processor 359).

At 902, the UE 602 transmits a first signal in UL resources to a first BS (e.g., the BS 604). The first signal may be a SRS, data (on a PUSCH), or control information (on a PUCCH).

At 904, the UE 602 receives a second signal in downlink (DL) resources concurrently with the transmission of the first signal to the BS 604. The second signal may be received from the BS 604 or from a second BS (e.g., the BS 606) that is different from the BS 604. The received second signal includes interference associated with the transmitted first signal, which may include interference associated with the transmitted SRS. Additionally or alternatively, the received second signal may include CSI-RS with interference associated with the transmitted first signal.

At 906, an interference threshold may be determined. The interference threshold may be based on a configuration received by the UE 602 or based on a UE capability of the UE 602.

At 908, a level of the interference received in the second signal that is associated with the transmitted first signal is determined by the UE 602. For example, the level of interference may be determined by the UE 602 based upon at least one of a request received from the BS 604, a determination that a RSRP of the RS is less than a threshold, or expiration of a timer.

At 910, the UE 602 may determine at least one of a number of REs or a number of RBs for a guard band (e.g., the guard band 806) that is to be incorporated between the UL resources and the DL resources (e.g., the UL resources 802 and the DL resources 804), where the determined level of interference due to the transmitted first signal within the DL resources immediately adjacent to the guard band is less than the interference threshold.

At 912, the UE 602 transmits information associated with the determined level of interference to the BS 604. The transmitted information may indicate at least one of a number of REs or a number of RBs at which the determined level of interference is less than the interference threshold. The transmitted information associated with the at least one of the number of REs or the number of RBs may further define a size of the guard band (e.g., the guard band 806) within the DL resources 804 and immediately adjacent to the UL resources 802. The transmitted information may be transmitted in a report via at least one of a PUCCH or a PUSCH.

In certain configurations, the UE 602 may receive a third signal in second DL resources concurrently with transmission of the first signal to the BS 604. The received third signal includes second interference associated with the transmitted first signal. In such cases (e.g., diagram 820), the UL resources 822 are between the DL resources 824a and the second DL resources 824b. The UE 602 is configured to determine a second level of the second interference received in the third signal associated with the transmitted first signal and transmit the second information associated with the determined second level of the second interference to the BS 604. The determination may be made separately from or concurrently with the determination of the first level of interference.

At 914, the UE 602 may communicate with the BS 604 through the UL resources 802 and the DL resources 804, excluding the guard band 806. The UL resources may be TDMed with other UL resources associated with other UEs or frequency-division multiplexed (FDMed) with the other UL resources associated with the other UEs. With respect to the latter, the UL resources and the DL resources may be adjacent to each other (e.g., separated by a guard band but in proximity to each other) or immediately adjacent to each other (e.g., having a shared boundary with no guard band separating the UL resources and the DL resources). When the UL resources are FDMed, a guard band between the UL resources and the other UL resources includes a size that is greater than a threshold size (e.g., a threshold size defined by the number of REs or the number of RBs).

At 916, the UE 602 may transmit information to the BS 604 indicating a capability associated with self-interference cancellation. The information may indicate at least one of one or more different IC techniques or a number of kernels used in the IC.

At 918, the UE 602 may receive a configuration from the BS 604 for turning on or turning off the self-interference cancellation. The IC may be switched off for power saving purposes or when the bandwidth is too large to apply IC.

At 920, upon receiving a DL communication from the BS 604, the UE 602 may cancel self-interference within the DL communication based on the determined level of interference when the self-interference cancelation is configured to be on.

Accordingly, concurrent transmission of UL resources and reception of DL resources allows the UE to measure a level of interference between the DL resources and the UL resources, and report information associated with the determined level of interference to a BS. For example, the UE may report a number of REs or a number of RBs at which the determined level of interference is less than an interference threshold. The information reported to the BS may be indicative of a guard band that is to be incorporated between the UL resources and the DL resources. As such, interferences measurement and reporting is performed by the UE to improve spectral efficiency and reduce interference between the UL resources and the DL resources, such as through implementation of a guard band.

Figure 10:
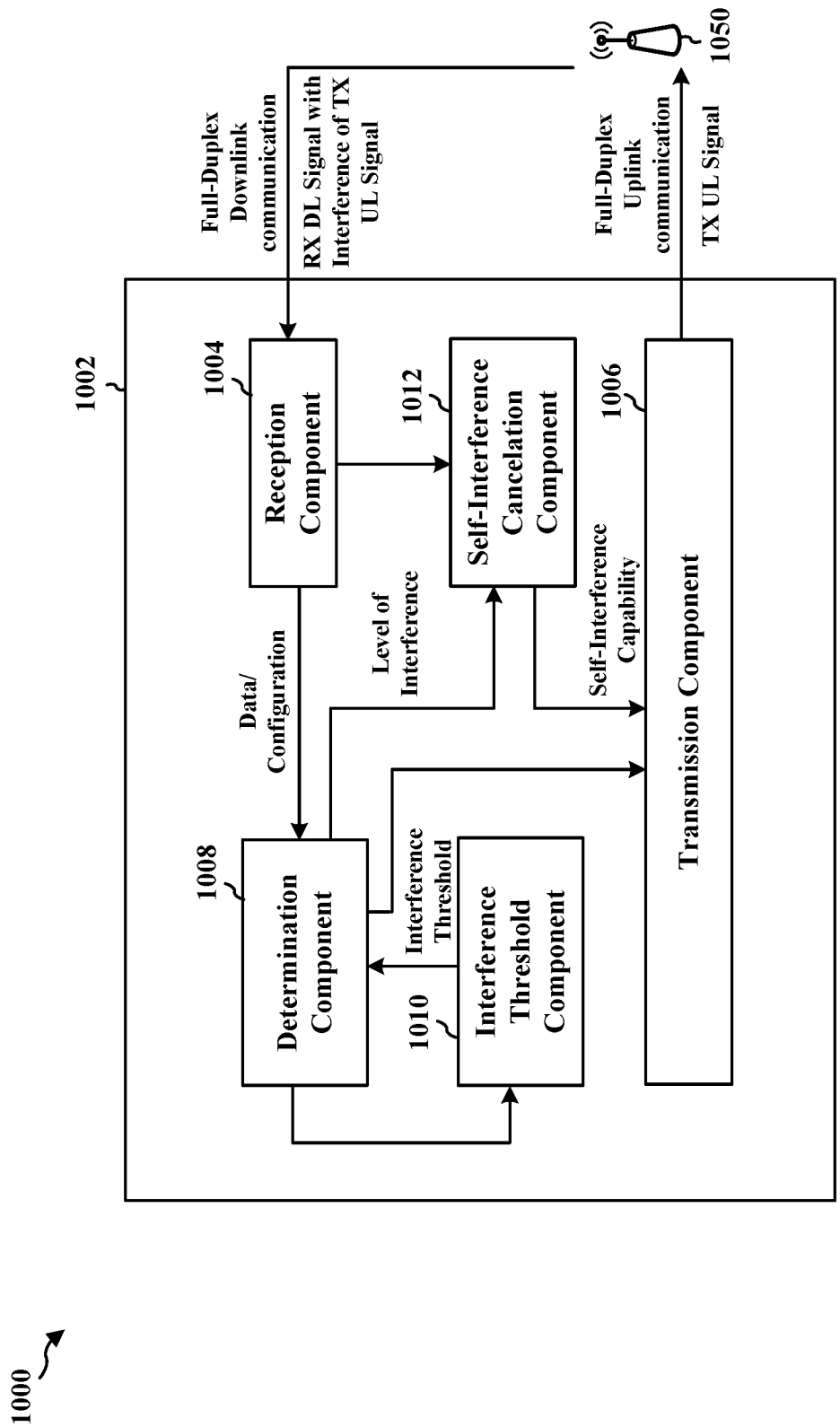
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE (e.g., UE 104, 350, 404a, 404b, 404c, 406a, 406b, 406c, 602) in wireless communication with base station 1050.

The apparatus includes a transmission component 1006 that transmits full-duplex uplink communication to the base station 1050. The transmission component 1006 may be configured to transmit various messages to one or more external devices, e.g., including the base station 1050, in accordance with the methods disclosed herein. The messages/signals to be transmitted may be generated by one or more other components as discussed above, or the messages/signals to be transmitted may be generated by the transmission component 1006 under the direction/control of the one or more other components discussed supra. Thus, in various configurations, via the transmission component 1006, the apparatus 1002 and/or one or more components therein transmit signals and/or other information (e.g., such as uplink data, control messages and/or other signals) to external devices such as the base station 1050. In some aspects, the transmission component 1006 is configured to transmit a first signal in UL resources to a first base station, e.g., as described in connection with block 902 of FIG. 9. The transmission component 1006 is also configured to transmit information associated with a determined level of interference to the first base station, e.g., as described in connection with block 912 of FIG. 9. In some aspects, the transmitted information indicates a size of a guard band within the DL resources and immediately adjacent to the UL resources. In some aspects, the transmission component 1006 may communicate with the first base station through the UL resources and the DL resources excluding the guard band, e.g., as described in connection with block 914 of FIG. 9. In some aspects, the transmitted first signal comprises sounding reference signals. In some aspects, the UL resources and the DL resources are adjacent to each other. In some aspects, the UL resources and DL resources are immediately adjacent to each other or are separated by a guard band. In some aspects, the UL resources are time division multiplexed with other UL resources associated with other UEs. In some aspects, the UL resources are frequency division multiplexed with other UL resources associated with other UEs, wherein a guard band between the UL resources and the other UL resources has a size greater than a threshold size. In some aspects, the information is transmitted in a report in at least one of a physical uplink control channel or a physical uplink shared channel.

The apparatus includes a reception component 1004 that receives full-duplex downlink communication from the base station 1050. The reception component 1004 may be configured to receive signals and/or other information from other devices including, e.g., base station 1050. The signals/information received by the reception component 1004 may be provided to one or more components of the apparatus 1002 for further processing and use in performing various operations in accordance with the methods discussed supra including the process of flowchart 900. Thus, via the reception component 1004, the apparatus 1002 and/or one or more components therein receive signals and/or other information (e.g., such as downlink data for the apparatus 1002 and/or other control signaling) from the base station 1050 as discussed supra and also discussed more specifically infra. In some aspects, the reception component 1004 is configured to receive a second signal in DL resources concurrently with the transmission of the first signal to the first base station, e.g., as described in connection with block 904 of FIG. 9. In some aspects, the received second signal includes interference associated with the transmitted first signal. In some aspects, the second signal is received from the first base station. In some aspects, the second signal is received from a second base station different from the first base station. In some aspects, the received second signal comprises interference associated with the transmitted SRS. In some aspects, the received second signal comprises channel state information reference signals with interference associated with the transmitted first signal.

The apparatus includes a determination component 1008 configured to determine a level of the interference received in the second signal that is associated with the transmitted first signal, e.g., as described in connection with block 908 of FIG. 9. In some aspects, the level of the interference is determined upon at least one of receipt of a request from the first base station, a determination that a reference signal received power of received RS is less than a threshold, or an expiration of a timer.

The apparatus includes an interference threshold component 1010 configured to determine an interference threshold, e.g., as described in connection with block 906 of FIG. 9. In some aspects, the transmitted information indicates at least one of a number of resource elements or a number of resource blocks at which the determined level of interference is less than the interference threshold. In some aspects, the interference threshold component 1010 may receive a configuration of the interference threshold through the reception component 1004. The interference threshold component 1010 may determine the interference threshold based on a UE capability of the UE.

The apparatus may also include a self-interference cancelation component 1012 configured to receive DL communication from the first base station, through the reception component 1004, and cancel self-interference within the DL communication based on the determined level of interference when the self-interference cancelation is configured to be on, e.g., as described in connection with block 920 of FIG. 9. In some aspects, the self-interference cancelation component 1012 may receive a configuration from the first base station, through the reception component 1004, for turning on or turning off self-interference cancelation, e.g., as described in connection with block 918 of FIG. 9. The self-interference cancelation component 1012 may transmit, through the transmission component 1006, information to the first base station indicating a capability associated with the self-interference cancelation, e.g., as described in connection with block 916 of FIG. 9. In some aspects, the information indicates at least one of one or more different interference cancelation techniques or a number of kernels used in interference cancelation.

In some aspects, the reception component 1004 may receive a third signal in second DL resources concurrently with the transmission of the first signal to the first base station. In some aspects, the received third signal includes second interference associated with the transmitted first signal. In some aspects, the UL resources being between the DL resources and the second DL resources. In some aspects, the determination component 1008 may determine a second level of the second interference received in the third signal that is associated with the transmitted first signal. In some aspects, the transmission component 1006 may transmit second information associated with the determined second level of the second interference to the first base station.

In some aspects, the interference threshold component 1010, in conjunction with the determination component 1008, may determine the at least one of the number of REs or the number of RBs for a guard band between the UL resources and the DL resources where the determined level of interference due to the transmitted first signal within the DL resources immediately adjacent to the guard band is less than the interference threshold, e.g., as described in connection with block 910 of FIG. 9. In some aspects, the transmitted information is associated with the at least one of the number of REs or the number of RBs defining a size of the guard band.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
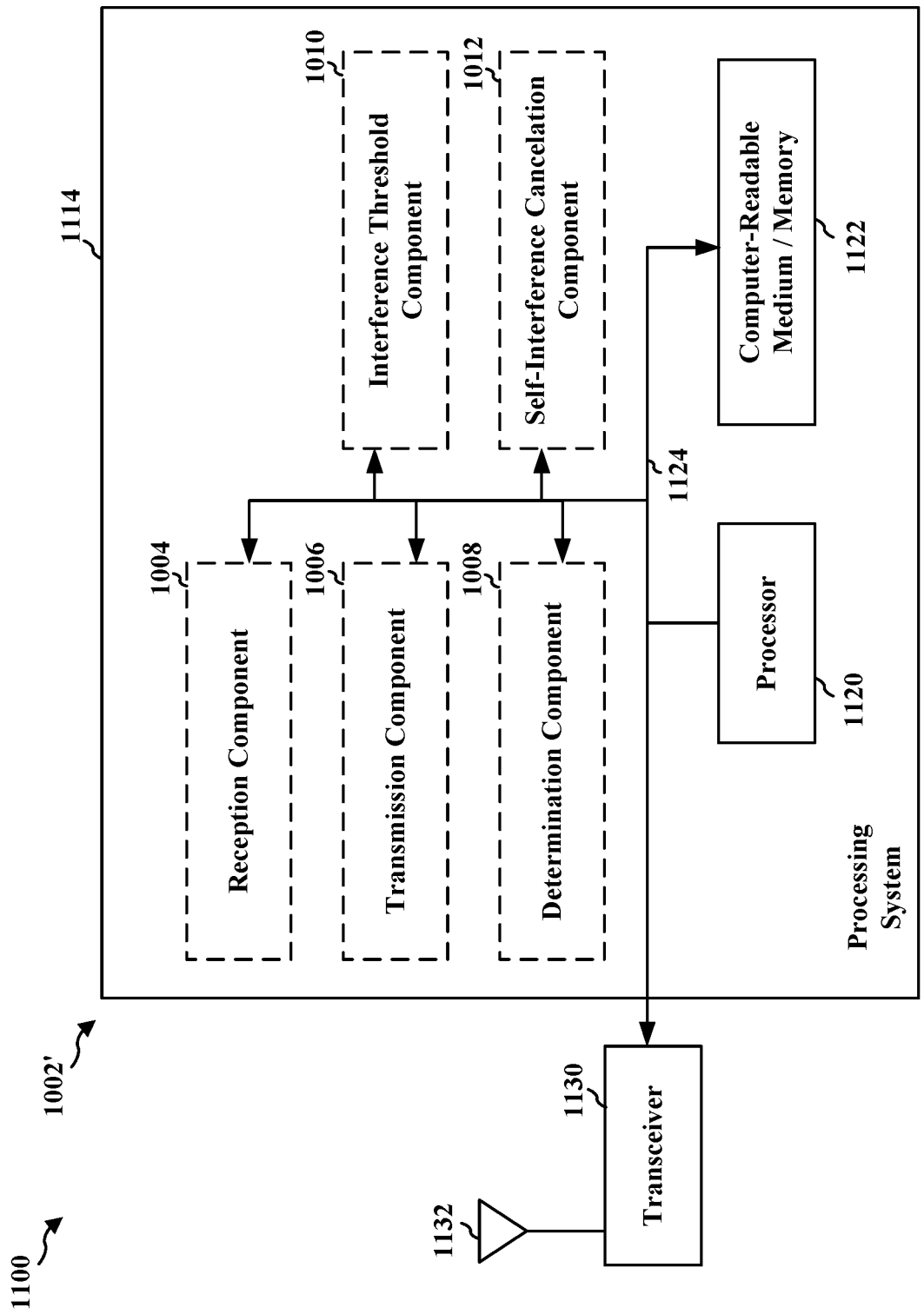
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1120, the components 1004, 1006, 1008, 1010, 1012, and the computer-readable medium/memory 1122. The bus 1124 may also link various other circuits such as timing sources, peripherals, voltage regulators, and power management circuits, which are well known in the art, and therefore, will not be described any further.

The processing system 1114 may be coupled to a transceiver 1130. The transceiver 1130 is coupled to one or more antennas 1132. The transceiver 1130 provides a means for communicating with various other apparatus over a transmission medium. The transceiver 1130 receives a signal from the one or more antennas 1132, extracts information from the received signal, and provides the extracted information to the processing system 1114, specifically the reception component 1004. In addition, the transceiver 1130 receives information from the processing system 1114, specifically the transmission component 1006, and based on the received information, generates a signal to be applied to the one or more antennas 1132. The processing system 1114 includes a processor 1120 coupled to a computer-readable medium/memory 1122. The processor 1120 is responsible for general processing, including the execution of software stored on the computer-readable medium/memory 1122. The software, when executed by the processor 1120, causes the processing system 1114 to perform the various functions described supra for any particular apparatus. The computer-readable medium/memory 1122 may also be used for storing data that is manipulated by the processor 1120 when executing software. The processing system 1114 further includes at least one of the components 1004, 1006, 1008, 1010, 1012. The components may be software components running in the processor 1120, resident/stored in the computer readable medium/memory 1122, one or more hardware components coupled to the processor 1120, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for transmitting a first signal in uplink (UL) resources to a first base station, means for receiving a second signal in downlink (DL) resources concurrently with the transmission of the first signal to the first base station, the received second signal including interference associated with the transmitted first signal, means for determining a level of the interference received in the second signal that is associated with the transmitted first signal, and means for transmitting information associated with the determined level of interference to the first base station. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples are illustrative only and may be combined with aspects of other embodiments or teachings described herein, without limitation.

Aspect 1 is a method of wireless communication of a wireless device at a user equipment (UE) that includes transmitting a first signal in uplink (UL) resources to a first base station; receiving a second signal in downlink (DL) resources concurrently with the transmission of the first signal to the first base station, the received second signal including interference associated with the transmitted first signal; determining a level of the interference received in the second signal that is associated with the transmitted first signal; and transmitting information associated with the determined level of interference to the first base station.

In Aspect 2, the method of Aspect 1 further includes that the transmitted information indicates a size of a guard band within the DL resources and immediately adjacent to the UL resources, and the method further comprises communicating with the first base station through the UL resources and the DL resources excluding the guard band. In Aspect 3, the method of Aspect 1 or Aspect 2 further includes that the second signal is received from the first base station.

In Aspect 4, the method of any of Aspects 1-3 further includes that the second signal is received from a second base station different from the first base station.

In Aspect 5, the method of any of Aspects 1-4 further includes that the transmitted first signal comprises sounding reference signals (SRS), and the received second signal comprises interference associated with the transmitted SRS.

In Aspect 6, the method of any of Aspects 1-5 further includes that the received second signal comprises channel state information (CSI) reference signals (RS) (CSI-RS) with interference associated with the transmitted first signal.

In Aspect 7, the method of any of Aspects 1-6 further includes that the UL resources and the DL resources are adjacent to each other.

In Aspect 8, the method of any of Aspects 1-7 further includes that the UL resources and DL resources are immediately adjacent to each other or are separated by a guard band.

In Aspect 9, the method of any of Aspects 1-8 further includes receiving a third signal in second DL resources concurrently with the transmission of the first signal to the first base station, the received third signal including second interference associated with the transmitted first signal, the UL resources being between the DL resources and the second DL resources; determining a second level of the second interference received in the third signal that is associated with the transmitted first signal; and transmitting second information associated with the determined second level of the second interference to the first base station.

In Aspect 10, the method of any of Aspects 1-9 further includes determining an interference threshold, wherein the transmitted information indicates at least one of a number of resource elements (REs) or a number of resource blocks (RBs) at which the determined level of interference is less than the interference threshold.

In Aspect 11, the method of any of Aspects 1-10 further includes receiving a configuration of the interference threshold.

In Aspect 12, the method of any of Aspects 1-11 further includes that the interference threshold is based on a UE capability of the UE.

In Aspect 13, the method of any of Aspects 1-12 further includes determining the at least one of the number of REs or the number of RBs for a guard band between the UL resources and the DL resources where the determined level of interference due to the transmitted first signal within the DL resources immediately adjacent to the guard band is less than the interference threshold, and wherein the transmitted information is associated with the at least one of the number of REs or the number of RBs defining a size of the guard band.

In Aspect 14, the method of any of Aspects 1-13 further includes that the information is transmitted in a report in at least one of a physical uplink control channel (PUCCH) or a physical uplink shared channel (PUSCH).

In Aspect 15, the method of any of Aspects 1-14 further includes that the level of the interference is determined upon at least one of receipt of a request from the first base station, a determination that a reference signal (RS) received power (RSRP) of received RS is less than a threshold, or an expiration of a timer.

In Aspect 16, the method of any of Aspects 1-15 further includes that the UL resources are time division multiplexed (TDMed) with other UL resources associated with other UEs.

In Aspect 17, the method of any of Aspects 1-16 further includes that the UL resources are frequency division multiplexed (FDMed) with other UL resources associated with other UEs, wherein a guard band between the UL resources and the other UL resources has a size greater than a threshold size.

In Aspect 18, the method of any of Aspects 1-17 further includes receiving a configuration from the first base station for turning on or turning off self-interference cancelation.

In Aspect 19, the method of any of Aspects 1-18 further includes receiving DL communication from the first base station; and canceling self-interference within the DL communication based on the determined level of interference when the self-interference cancelation is configured to be on.

In Aspect 20, the method of any of Aspects 1-19 further includes transmitting information to the first base station indicating a capability associated with the self-interference cancelation, the information indicating at least one of one or more different interference cancelation (IC) techniques or a number of kernels used in IC.

Aspect 21 is a device including one or more processors and one or more memories in electronic communication with the one or more processors storing instructions executable by the one or more processors to cause the system or apparatus to implement a method as in any of Aspects 1 to 20.

Aspect 22 is a system or apparatus including means for implementing a method or realizing an apparatus as in any of Aspects 1 to 20.

Aspect 23 is a non-transitory computer readable medium storing instructions executable by one or more processors to cause the one or more processors to implement a method as in any of Aspects 1 to 20.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a wireless device at a user equipment (UE), comprising:
    transmitting a first signal in uplink (UL) resources to a first base station;
    receiving a second signal in downlink (DL) resources concurrently with transmission of the first signal to the first base station, the received second signal including interference associated with the transmitted first signal;
    determining a level of the interference received in the second signal that is associated with the transmitted first signal; and
    transmitting information associated with the level of the interference to the first base station, the information indicating at least one of a number of resource elements (REs) or a number of resource blocks (RBs) from the UL resources at which the level of the interference does not exceed an interference threshold.

2. The method of claim 1, wherein the transmitted information indicates a size of a guard band within the DL resources and immediately adjacent to the UL resources, and the method further comprises communicating with the first base station through the UL resources and the DL resources excluding the guard band.

3. The method of claim 1, wherein the second signal is received from the first base station.

4. The method of claim 1, wherein the second signal is received from a second base station different from the first base station.

5. The method of claim 1, wherein the transmitted first signal comprises sounding reference signals (SRS), and the received second signal comprises interference associated with the transmitted SRS.

6. The method of claim 1, wherein the received second signal comprises channel state information (CSI) reference signals (RS) (CSI-RS) with interference associated with the transmitted first signal.

7. The method of claim 1, wherein the UL resources and the DL resources are adjacent to each other.

8. The method of claim 1, wherein the UL resources and DL resources are separated by a guard band.

9. The method of claim 1, further comprising:
    receiving a third signal in second DL resources concurrently with the transmission of the first signal to the first base station, the received third signal including second interference associated with the transmitted first signal, the UL resources being between the DL resources and the second DL resources;

determining a second level of the second interference received in the third signal that is associated with the transmitted first signal; and transmitting second information associated with the determined second level of the second interference to the first base station.

10. The method of claim 1, further comprising determining the interference threshold based on one or more of a received configuration or a capability of the UE.

11. The method of claim 1, further comprising receiving a configuration of the interference threshold.

12. The method of claim 1, wherein the interference threshold is based on a UE capability of the UE.

13. The method of claim 1, further comprising determining the at least one of the number of REs or the number of RBs for a guard band between the UL resources and the DL resources where the level of the interference due to the transmitted first signal within the DL resources immediately adjacent to the guard band is less than the interference threshold, and wherein the transmitted information is associated with the at least one of the number of REs or the number of RBs defining a size of the guard band.

14. The method of claim 1, wherein the information is transmitted in a report in at least one of a physical uplink control channel (PUCCH) or a physical uplink shared channel (PUSCH).

15. The method of claim 1, wherein the level of the interference is determined upon at least one of receipt of a request from the first base station, a determination that a reference signal (RS) received power (RSRP) of received RS is less than a threshold, or an expiration of a timer.

16. The method of claim 1, wherein the UL resources are time division multiplexed (TDMed) with other UL resources associated with other UEs.

17. The method of claim 1, wherein the UL resources are frequency division multiplexed (FDMed) with other UL resources associated with other UEs, wherein a guard band between the UL resources and the other UL resources has a size greater than a threshold size.

18. The method of claim 1, further comprising:
receiving a configuration from the first base station for turning on or turning off self-interference cancelation;
receiving DL communication from the first base station;
canceling self-interference within the DL communication based on the level of the interference when the self-interference cancelation is configured to be on; and
transmitting information to the first base station indicating a capability associated with the self-interference cancelation, the information indicating at least one of one or more different interference cancelation (IC) techniques or a number of kernels used in IC.

19. An apparatus for wireless communication, the apparatus being a wireless device at a user equipment (UE), comprising:
a memory; and
at least one processor coupled to the memory and configured to:
transmit a first signal in uplink (UL) resources to a first base station;
receive a second signal in downlink (DL) resources concurrently with transmission of the first signal to the first base station, the received second signal including interference associated with the transmitted first signal;
determine a level of the interference received in the second signal that is associated with the transmitted first signal; and
transmit information associated with the level of the interference to the first base station, the information indicating at least one of a number of resource elements (REs) or a number of resource blocks (RBs) from the UL resources at which the level of the interference does not exceed an interference threshold.

20. The apparatus of claim 19, wherein the transmitted information indicates a size of a guard band within the DL resources immediately adjacent to the UL resources, and the at least one processor further configured to communicate with the first base station through the UL resources and the DL resources excluding the guard band.

21. The apparatus of claim 19, wherein the at least one processor is further configured to:
receive a third signal in second DL resources concurrently with the transmission of the first signal to the first base station, the received third signal including second interference associated with the transmitted first signal, the UL resources being between the DL resources and the second DL resources;
determine a second level of the second interference received in the third signal that is associated with the transmitted first signal; and
transmit second information associated with the determined second level of the second interference to the first base station.

22. The apparatus of claim 19, wherein:
the at least one processor is further configured to:
receive a configuration of the interference threshold, and
determine the interference threshold from the configuration, the interference threshold is based on a UE capability of the UE.

23. The apparatus of claim 22, wherein the at least one processor is further configured to determine the at least one of the number of REs or the number of RBs for a guard band between the UL resources and the DL resources where the level of the interference due to the transmitted first signal within the DL resources immediately adjacent to the guard band is less than the interference threshold, and wherein the transmitted information is associated with the at least one of the number of REs or the number of RBs defining a size of the guard band.

24. The apparatus of claim 19, wherein the information is transmitted in a report in at least one of a physical uplink control channel (PUCCH) or a physical uplink shared channel (PUSCH).

25. The apparatus of claim 19, wherein the level of the interference is determined upon at least one of a receipt of a request from the first base station, a determination that a reference signal (RS) received power (RSRP) of received RS is less than a threshold, or an expiration of a timer.

26. The apparatus of claim 19, wherein the UL resources are time division multiplexed (TDMed) with other UL resources associated with other UEs.

27. The apparatus of claim 19, wherein the UL resources are frequency division multiplexed (FDMed) with other UL resources associated with other UEs, wherein a guard band between the UL resources and the other UL resources has a size greater than a threshold size.

28. The apparatus of claim 19, wherein the at least one processor is further configured to:
receive a configuration from the first base station for turning on or turning off self-interference cancelation;
receive DL communication from the first base station;

cancel self-interference within the DL communication based on the level of the interference when the self-interference cancelation is configured to be on; and transmit information to the first base station indicating a capability associated with the self-interference cancelation, the information indicating at least one of one or more different interference cancelation (IC) techniques or a number of kernels used in IC.

29. An apparatus for wireless communication, the apparatus being a wireless device at a user equipment (UE), comprising:

means for transmitting a first signal in uplink (UL) resources to a first base station;

means for receiving a second signal in downlink (DL) resources concurrently with transmission of the first signal to the first base station, the received second signal including interference associated with the transmitted first signal;

means for determining a level of the interference received in the second signal that is associated with the transmitted first signal; and means for transmitting information associated with the level of the interference to the first base station, the information indicating at least one of a number of resource elements (REs) or a number of resource blocks (RBs) from the UL resources at which the level of the interference does not exceed an interference threshold.

30. A non-transitory computer-readable medium storing computer executable code, the code when executed by a processor of a wireless device at a user equipment (UE) causes the processor to:

transmit a first signal in uplink (UL) resources to a first base station;

receive a second signal in downlink (DL) resources concurrently with transmission of the first signal to the first base station, the received second signal including interference associated with the transmitted first signal;

determine a level of the interference received in the second signal that is associated with the transmitted first signal; and transmit information associated with the level of the interference to the first base station, the information indicating at least one of a number of resource elements (REs) or a number of resource blocks (RBs) from the UL resources at which the level of the interference does not exceed an interference threshold.

* * * * *